Patented Mar. 13, 1951

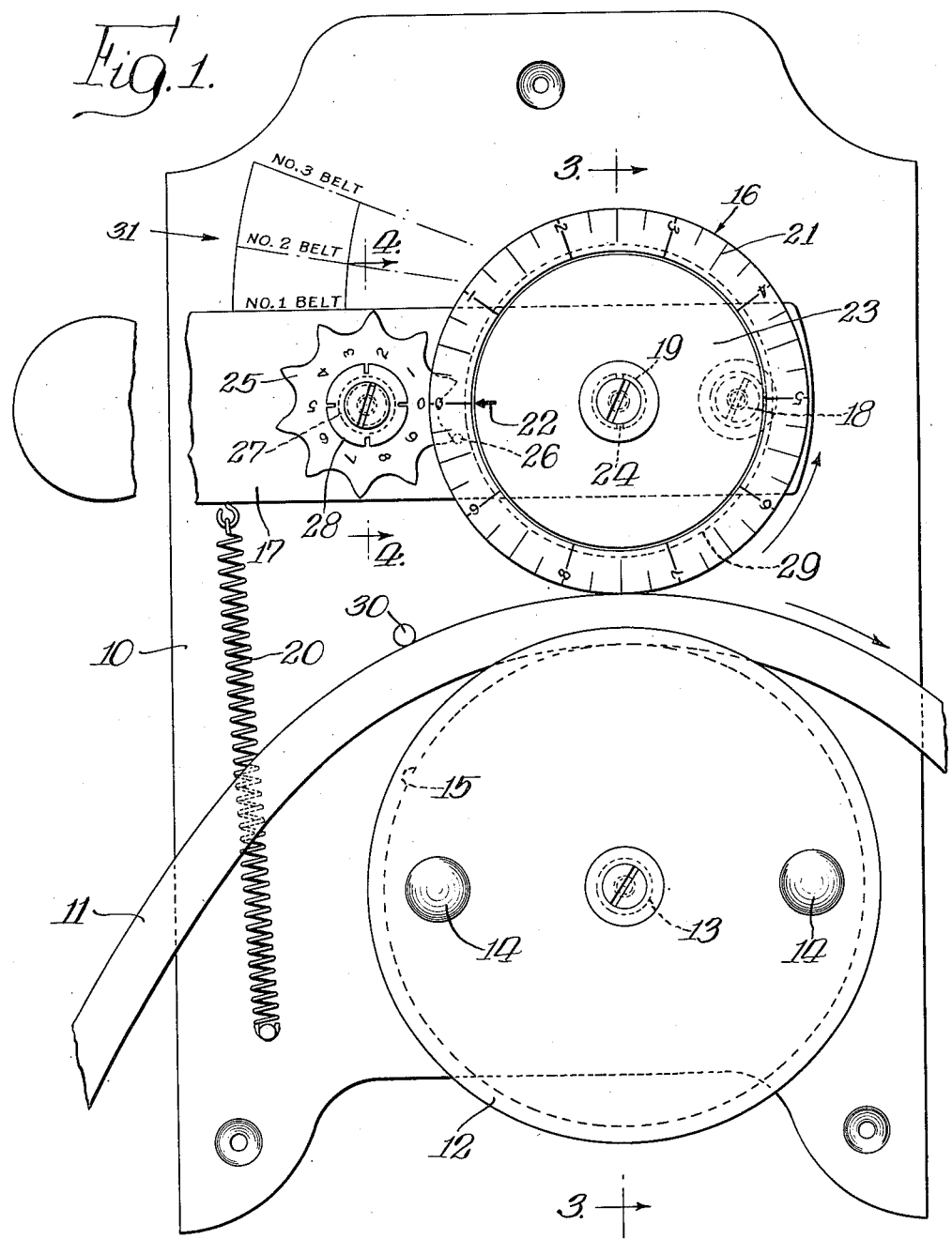

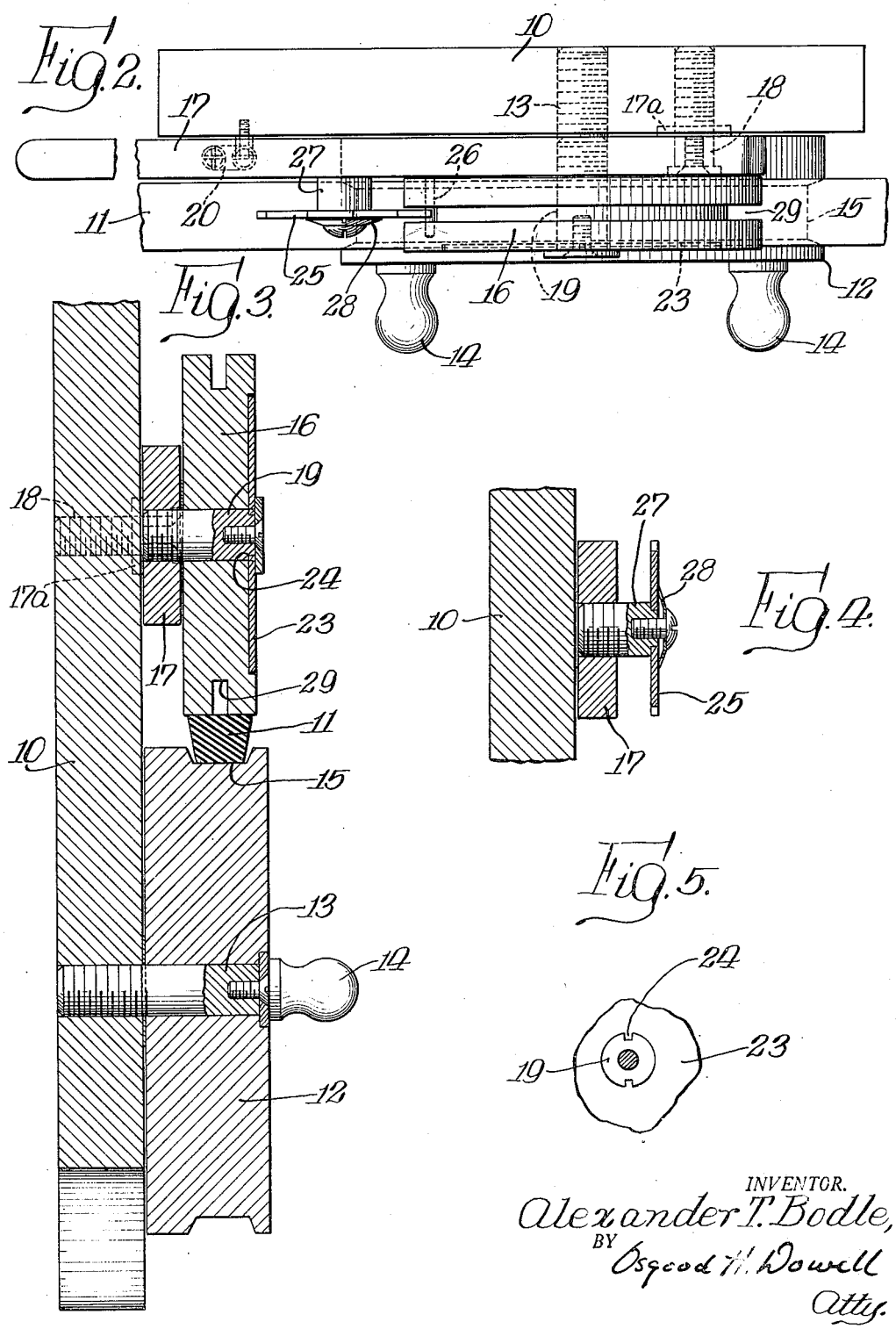

2,545,189

UNITED STATES PATENT OFFICE 2,545,189

BELT MEASURING DEVICE

Alexander T. Bodle, Mishawaka, Ind., assignor to Dodge Manufacturing Corporation, Mishawaka, Ind., a corporation of Indiana Application May 5, 1948, Serial No. 25,247

9 Claims. (Cl. 33—129)

This invention relates to a device for measuring the length of an endless belt.

The inventor has in contemplation principally the measuring of V-belts. These are endless belts of trapezoidal cross-section for engaging in V-type belt-grooves of power transmission sheaves. The length of a V-belt is the distance around it measured on its outside surface. The majority of such belts are of lengths less than one hundred inches, though longer V-belts are employed in some power transmissions.

V-belts are made in different cross-sectional sizes which are designated commercially by numerals, letters or the like. A person ordering a V-belt of a given make should specify its length and its size designation or its thickness from which the cross-sectional size can be determined.

The devices most commonly used for measuring the lengths of such belts are of the type in which the belt to be measured is placed around and stretched between a pair of semicircular heads adjustably connected by a stick having a scale to indicate the completed length of the belt so stretched if it be of a certain thickness, or having a series of such scales for use with belts of several different thicknesses. In the use of such devices, the length-measuring function of which is dependent upon belt thickness, there is opportunity for confusion and mistake. Furthermore the indication of length given by such a device may be materially affected by the stretching of the belt, with resultant error in the indication.

It is therefore desirable to provide for the measuring of such belts by a more practical and reliable means than of the type above referred to.

An object of the present invention is the provision of a simple and conveniently usable device by which the length of an endless belt can be measured with substantial accuracy or such near accuracy as to suffice for practical purposes. A further object is to provide such a device adapted for measuring the lengths of endless V-belts and which will also indicate the thickness of the belt being measured or its size designation.

The invention utilizes the principle of rolling contact of a measuring roller with the outside surface of the belt while running it for the distace of its length between said roller and a coacting roller or pulley adapted to be enclosed by and to support the belt. The measuring roller is carried by a lever by which it can be displaced from contact with the belt. Said lever carries a means operated by the measuring roller to count the number of complete rotations thereof in a belt-measuring operation, and a dial and pointer associated with and controlled by said roller indicates the distance measured thereby in excess of that indicated by such number of complete rotations.

The lever carrying the measuring roller is utilized in cooperation with a fixed scale to indicate belt thickness.

In the accompanying drawings, there is shown for illustration a device embodying the invention in one practicable form.

Fig. 1 is a front elevation of the illustrative device.

Fig. 2 is a top plan view thereof.

Fig. 3 is a vertical section taken on the line 3—3 of Fig. 1.

Fig. 4 is a section taken on the line 4—4 of Fig. 1 through the lever aforesaid and a star wheel carried thereby.

Fig. 5 is a detail view showing the central part of a circular instruction plate associated with the measuring roller.

The illustrative device is a small compact machine having its movable parts mounted on a back plate 10 to be affixed to a wall or other convenient support at an appropriate elevation.

In the drawings, 11 denotes an endless V-belt, only partially shown.

12 is a driving pulley or roller on which the belt hangs. As shown, the back plate 10 has fixed thereto and projecting therefrom a stud axle 13 on which said pulley is mounted, whereby it is supported for rotation on a horizontal axis and in such manner as to permit hanging the belt thereon and removing it therefrom. The pulley is shown equipped with a pair of diametrically oppositely arranged knobs 14 by either of which it can be manually rotated.

There is formed in the periphery of the driving pulley a shallow annular groove 15 in which the belt rests, said groove having a cylindrical ground and being wider than the portion of the belt therein. The beveled side walls of said groove form guide shoulders for engagement by the belt in case it should tend to run out of a straight course or to wander from side to side as the pulley is rotated.

16 is a measuring roller arranged over the driving pulley 12 and coacting therewith to grip or squeeze the belt. This measuring roller is carried by a lever 17 pivoted to the back plate 10 for movement parallel with the plane of rotation of said pulley and roller. As shown, the back plate 10 has fixed thereto the pivot pin 18 for said lever, and the latter has fixed thereto the axle pin 19 for the measuring roller. The lever is preferably of the second order and arranged as shown. It is yieldingly urged by a retractile spring 20 in a direction to press the measuring roller against the belt, but can be raised against the resistance of said spring to lift the roller from contact with the belt, so as to permit emplacement and removal of the belt and to permit resetting of the hereinafter mentioned dials after a belt-measuring operation. The lever may be of any appropriate length and provided at its end remote from its pivot with a handle for operating it.

By rotating the driving pulley 12, the belt 11 is caused to travel between and in frictional engagement with said pulley and the measuring roller, whereby the latter is driven from said pulley in the reverse direction of rotation. The groove 15 guides the belt if guidance should be necessary, and prevents it from becoming displaced laterally from under the measuring roller.

The circumference of the measuring roller 16 equals a chosen number of standard units of linear measure, e. g. inches or centimeters. In this instance, the illustrative machine being designed for measuring inches V-belts of ordinary lengths, the measuring roller has a circumference of exactly ten inches. If the machine were designed for measuring longer belts in feet and inches, the roller would have a circumference of preferably one foot.

Said measuring roller is provided with a dial 21 concentric with and in fixed relation to the roller and having uniformly spaced marks denoting inches of the circumference of the roller and subdivisions thereof, the inch marks being consecutively numbered commencing with zero. Cooperating with the dial is a pointer 22 in fixed relation to the lever 17, whereby the distance measured by said roller in every complete or partial rotation thereof from its zero position will be indicated.

A circular plate 23, referred to as the instruction plate, which has thereon the pointer 22 and may bear printed directions for the use of the device, is arranged concentrically with the measuring roller and in fixed relation to the lever, said plate fitting on the axle pin 19 and fitting loosely in a circular recess in the front side of the measuring roller, so as to allow rotation of said roller relative to said plate. This instruction plate is secured against rotation by appropriate means, as by internal projections 24 from said plate engaging in notches in said axle pin, as shown in Fig. 5.

For counting the number of complete rotations of the measuring roller which occur in a belt measuring operation, the lever 17 carries a star wheel 25 having thereon a dial with which the pointer 22 cooperates, and said roller carries a pin 26 which in every complete rotation of the roller encounters one of the uniformly spaced teeth of the star wheel and turns the latter one step or the angular distance between centers of adjacent teeth. This movement of the star wheel by the pin 26 is timed to occur so that at the end of every such movement the measuring roller is at its zero position and a digit on the star wheel dial is opposite the pointer.

As shown, the lever 17 has fixed thereto a shouldered pin 27 on which the star wheel is rotatably mounted and held against axial movement by a spring washer 28 which bears under tension against the star wheel and thus imposes a frictional resistence to its rotation, so as to prevent the star wheel from turning by momentum a distance in excess of that through which it is impelled by the roller pin 26.

In order to permit arrangement of the star wheel and measuring roller for rotation in a common plane, the measuring roller is formed in its periphery with an annular slot 29 to receive the teeth of the star wheel as they are successively presented in the path of revolution of the roller pin 26, said pin being arranged crosswise of said slot.

The number of teeth of the star wheel 25 may be chosen to suit requirements as to the lengths of the belts to be measured. In the illustrative machine, the star wheel has ten teeth, so that in every complete rotation of the measuring roller the star wheel will be turned a tenth of a revolution. The star wheel dial comprises the same number of digits as the number of teeth, arranged in a circular series at uniformly spaced intervals, these digits being consecutive numbers commencing with zero.

In the intended use of the illustrative machine, which is designed for right hand operation, the driving roller or pulley 12 is rotated in a clockwise direction, with resultant rotation of the measuring roller 16 in a counter-clockwise direction and step by step rotation of the star wheel 25 in a clockwise direction. The dials on the measuring roller and star wheel have their digits or consecutive numbers arranged in proper order to suit such directions of rotation. It will be observed that the dial digits to be read with reference to the pointer 22 are brought by descending movements to adjacent positions opposite the pointer, so that the dials can be very easily read.

Assuming a belt-measuring operation to be commenced with the parts of the machine in the relative positions shown in Fig. 1, and that the belt be caused to travel in such operation the distance of its length, either by rotating the pulley 12 in a clockwise direction or by gently pulling the belt in said direction until a point or mark on the belt makes a complete circuit, then upon completion of such operation the length of the belt will be indicated by the dials. That is to say, the number of complete rotations made by the measuring roller 16 will be shown by the digit of the star wheel dial which is either directly opposite the pointer 22 or under the line of centers of the star wheel and pointer, and the distance measured in excess of that indicated by such number of complete rotations, if any, will be indicated by the units dial mark opposite the pointer. Stated differently, if the distance measured is an even multiple of ten inches, such multiple will be shown by a digit of the star wheel dial directly opposite the pointer and in line with the zero mark of the units dial on the measuring roller. If the distance measured be in excess of such multiple, then such multiple will be indicated by the digit of the star wheel dial immediately under the line of centers aforesaid, and such excess will be shown by the mark of the units dial opposite the pointer. For example, if the operation should bring the digit 2 of the star wheel dial and the digit 8 of the units dial to position to be read with reference to the pointer, the indicated measurement would be twenty-eight inches.

It will be observed that the illustrative machine as designed will allow measuring V-belts of lengths up to one hundred and ten inches. In the case of a belt of that length, the measuring operation would bring both dials to their zero positions, i. e. with their zero marks opposite the pointer, signifying eleven complete rotations of the measuring roller.

A pin 30 projecting from the back plate 10 provides a stationary index adjacent to which a mark can be made on the belt 11 before commencing the measuring operation. In such operation the driving pulley 12 should be rotated only until such mark makes a complete circuit. This is facilitated by use of the two knobs 14. As the mark on the belt is approaching the index pin, the operator can by taking hold of both knobs control the pulley 12 very nicely, so as to continue its rotation only until said mark is returned to its original position and to stop such rotation at the right instant.

The lever 17 is utilized in cooperation with a scale 31 on the back plate to indicate thickness of the belt being measured. This scale in the form shown comprises a series of oblique lines with which the upper edge of the lever will register in different positions of the lever, indicia being printed over said lines. The scale could be graduated to denote belt thickness in inches and fractions thereof or in fractions of an inch. However, the scale shown is to indicate cross-sectional sizes of V-belts made in the so-called standard sizes which are known commercially as Nos. 1, 2, 3, 4, etc. In the use of the illustrative machine for measuring such a belt, the size designation thereof will be given by the scale indicia appearing immediately over the lever.

A preferred manner of using the device is as follows:

While holding the lever 17 raised sufficiently to hold the measuring roller 16 out of the way, place the belt 11 around the driving pulley 12 and allow it to rest thereon in the groove 15. Release the lever, whereupon the tension of the spring 20 will hold the measuring roller firmly against the belt with sufficient pressure for effective gripping or squeezing of the belt between said pulley and measuring roller.

Again raise the lever sufficiently to move the measuring roller from contact with the belt, and, while holding it so raised, adjust the star wheel 25 and the measuring roller 16 to their zero positions, i. e. with the zero marks of their dials in line with the pointer 22, then lower and release the lever, so that the measuring roller will again rest on the belt.

Now read on the scale 31 the indicia of belt thickness or cross-sectional size appearing nearest the lever.

Put a mark on the belt adjacent to the index 30. Now rotate the driving pulley in a clockwise direction, by use of either of the knobs or handles 14, until the mark on the belt is brought nearly back to its original position. Then with a turn of the right hand, while pressing with the thumb and middle finger against the two knobs 14, continue such rotation of said pulley until said mark on the belt is brought to its original position.

The length of the belt will now be indicated as hereinbefore explained. That is to say, the number of complete rotations made by the measuring roller will be indicated by the digit of the star wheel in line with the pointer or immediately below a position in line with the pointer, and the measurement in excess of that so indicated will be shown by the mark on the dial 21 opposite said pointer.

In Figs. 2 and 3, the part marked 17a is a circular boss on the lever 17 fitting in a counterbore of the screw hole in 10 for the pivot pin 18.

Obviously the design and details of the illustrative device may be variously changed to suit different requirements and conditions.

I claim:

1. A device for measuring the length and indicating the thickness of an endless V-belt, said device comprising a manually rotatable pulley on which to hang the belt, said pulley having a wide shallow belt-guiding groove with a cylindrical ground for engagement by the inner surface of the belt, a measuring roller coactive with said pulley to grip the belt, whereby measurement of the length of the belt by said roller can be obtained by rotating said pulley until a point on the belt completes a circuit of travel, a lever carrying said roller and yieldingly urged to press it against the belt, a back plate carrying said pulley and to which said lever is pivoted, a scale on said plate traversable by and cooperable with said lever to indicate belt-thickness, and means operated by said roller for indicating length measurement.

2. A device for measuring the length and indicating the thickness of an endless V-belt, said device comprising a manually rotatable pulley on which to hang the belt, said pulley having a wide shallow belt-guiding groove with a cylindrical ground for engagement by the inner surface of the belt, a measuring roller coactive with said pulley to grip the belt, a lever carrying said roller and yieldingly urged to press it against the belt, a back plate carrying the axle of said pulley and to which said lever is pivoted, a scale on said plate traversable by and cooperable with said lever to indicate belt-thickness, an index on said plate so located near the bite of said pulley and roller that a mark can be made on the belt adjacent to said index, whereby measurement of the length of the belt by said roller can be obtained by rotating said pulley until said mark travels back to said index, and means operated by said roller for indicating length measurement.

3. A belt measuring device comprising a manually rotatable pulley on which to hang an endless belt, a measuring roller coactive with said pulley to grip the belt, a lever carrying said roller and yieldingly urged to press it against the belt, a support carrying said pulley and to which said lever is pivoted, said support having adjacent to said lever a flat surface provided with a scale traversable by and cooperable with said lever to indicate belt thickness, means carried by said lever and operated by said roller for counting the number of completed rotations thereof occurring as the belt is caused to travel for the distance of its length between and in frictional engagement with said pulley and roller, and a dial and pointer associated with said roller for indicating the distance measured by said roller in excess of that indicated by such number of complete rotations.

4. A belt-measuring device comprising a pulley on which to hang an endless belt, a measuring roller coacting with said pulley to grip the belt, a lever carrying said roller and yieldingly urged to press it against the belt, a back plate carrying said pulley and to which said lever is pivoted for movement parallel with the plane of rotation of said roller, a star-wheel carried by said lever on an axis parallel with and spaced from the axis of said roller, said roller having a pin which in every revolution thereof coacts with a tooth of said star-wheel to turn it one step, said roller and star-wheel being in front of said lever, said roller having a units dial on its front face and said star-wheel having on its front face a dial comprising an annular series of digits corresponding in number and arrangement to the teeth of said star-wheel, and a pointer cooperable with said dials carried by and in fixed relation to said lever, said dials and pointer being arranged so that the zero mark of the units dial and a digit of said star-wheel dial come to adjacent positions opposite said pointer on every complete rotation of said roller from its zero position, substantially as and for the purpose described.

5. A belt-measuring device comprising a pulley on which to hang an endless belt, a measuring roller coacting with said pulley to grip the belt, a lever carrying said roller and yieldingly urged to press it against the belt, said lever being arranged for movement parallel with the plane of rotation of said roller, a star-wheel carried by said lever on an axis parallel with and spaced from the axis of said roller, the roller being centered adjacent to the pivot of said lever between it and the star-wheel, said roller having a pin which in every revolution thereof coacts with a tooth of said star-wheel to turn it one step, said roller and star-wheel being in front of said lever, said roller having a units dial on its front face and said star-wheel having on its front face a dial comprising an annular series of digits corresponding in number and arrangement to the teeth of said star-wheel, and a pointer cooperable with said dials carried by and in fixed relation to said roller, said dials and pointer being arranged so that the zero mark of said units dial and a digit of said star-wheel dial come to adjacent positions opposite said pointer on every complete rotation of said roller from its zero position, substantially as and for the purpose described.

6. A belt-measuring device comprising a pulley on which to hang an endless belt, a measuring roller coacting with said pulley to grip the belt, a lever carrying said roller and yieldingly urged to press it against the belt, said lever being arranged for movement parallel with the plane of rotation of said roller, a star-wheel carried by said lever on an axis parallel with and spaced from the axis of said roller, said roller having an annular peripheral groove into which the teeth of said star-wheel project and having in said groove a transversely disposed pin which in every revolution thereof coacts with a tooth of said star-wheel to turn it one step, said roller and star-wheel being in front of said lever, said roller having a units dial on its front face and said star-wheel having on its front face a dial comprising an annular series of digits corresponding in number and arrangement to the teeth of said star-wheel, and a pointer cooperable with said dials carried by and in fixed relation to said lever, said dials and pointer being arranged so that the zero mark of said units dial and a digit of the star-wheel dial come to adjacent positions opposite the pointer on every complete rotation of said roller from its zero position, substantially as and for the purpose described.

7. A belt-measuring device comprising a pulley on which to hang an endless belt, a measuring roller coactive with said pulley to grip the belt, said roller having a concentric circular recess in its front side, a lever carrying said roller and yieldingly urging it against the belt, said lever having fixed thereto an axle for said roller, a circular plate fixed on said axle and loosely fitted in said recess, a dial and pointer arranged one on said roller and the other on said circular plate, and means carried by said lever and operated by said roller for counting the number of complete rotations of said roller resulting from travel of the belt for the distance of its length between and in frictional engagement with said pulley and roller, said dial cooperating with said pointer to indicate the distance measured by said roller in excess of that indicated by said number of complete rotations.

8. A belt-measuring device comprising a manually rotatable pulley on which to hang an endless belt, a measuring roller coactive with said pulley to grip the belt, a lever carrying said roller and yieldingly urged to press it against the belt, means carried by said lever and operated by said roller for counting the number of complete rotations thereof resulting from travel of the belt for the distance of its length between and in frictional engagement with said pulley and roller, and a dial and pointer associated with said roller for indicating the distance measured by said roller in excess of that indicated by such number of complete rotations, said pulley having on its front face a pair of diametrically oppositely arranged handles by either of which it can be rotated and by conjoint use of which the final movement of said pulley can be easily controlled to stop at the right point, said handles consisting of knobs spaced for simultaneous engagement by the thumb and middle finger of the operator.

9. A belt-measuring device comprising a pulley on which to hang an endless belt, a measuring roller coactive with said pulley to grip the belt, a lever carrying said roller and yieldingly urged to press it against the belt, a back plate carrying the pulley axle and to which said lever is pivoted, an index on said back plate so located near the bite of said pulley and roller that a mark can be made on the belt adjacent to said index, means carried by said lever and operated by said roller for indicating the number of complete rotations of said roller resulting from rotation of said pulley until said mark on the belt travels in a circuit back to its original position, and a dial and pointer associated with said roller for indicating the distance measured by said roller in excess of that indicated by such number of complete rotations.

ALEXANDER T. BODLE.

REFERENCES CITED

The following references are of record in the file of this patent:

UNITED STATES PATENTS

| Number | Name | Date |
| --- | --- | --- |
| 1,225,223 | Davis | May 8, 1917 |
| 1,391,431 | Turner | Sept. 20, 1921 |
| 1,624,633 | Spoerri | Apr. 12, 1927 |